July 21, 1931.                C. MILLER                1,815,794
                              PLOW HITCH
                   Filed Nov. 4, 1929       2 Sheets-Sheet 1
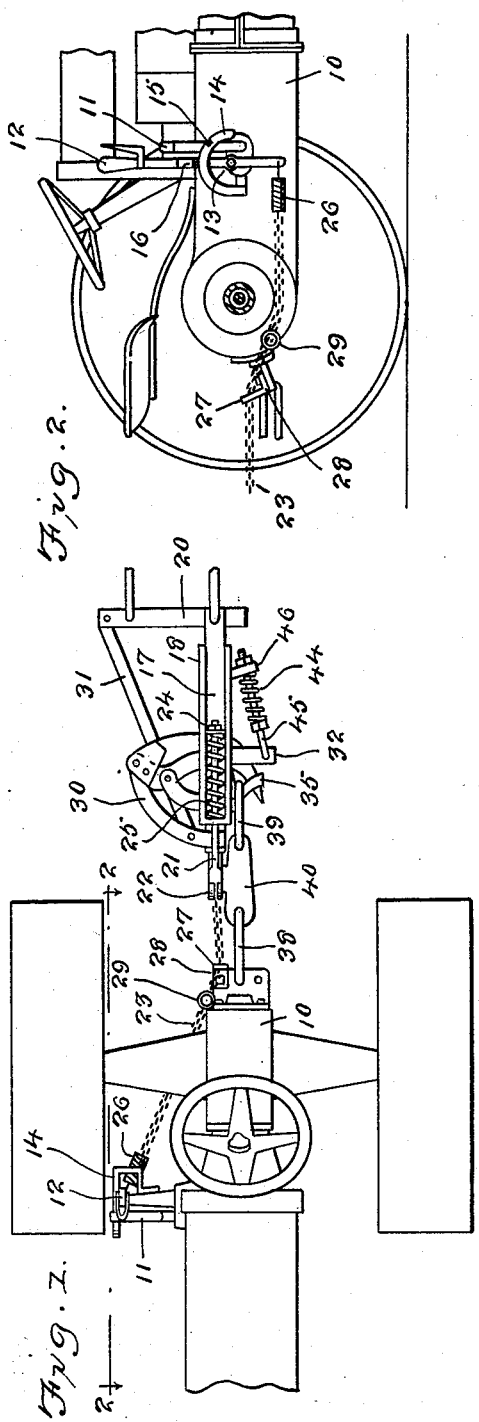
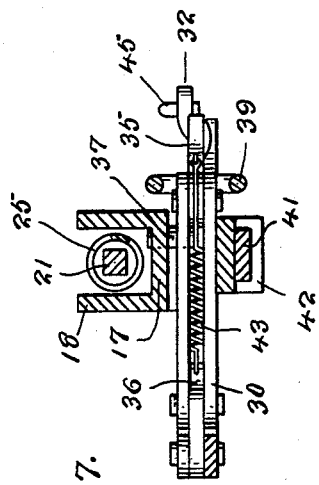
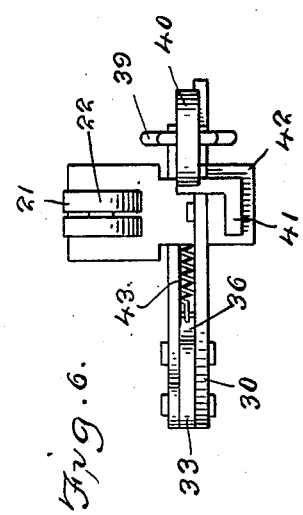
Conda Miller
INVENTOR
BY Victor J. Evans
ATTORNEY

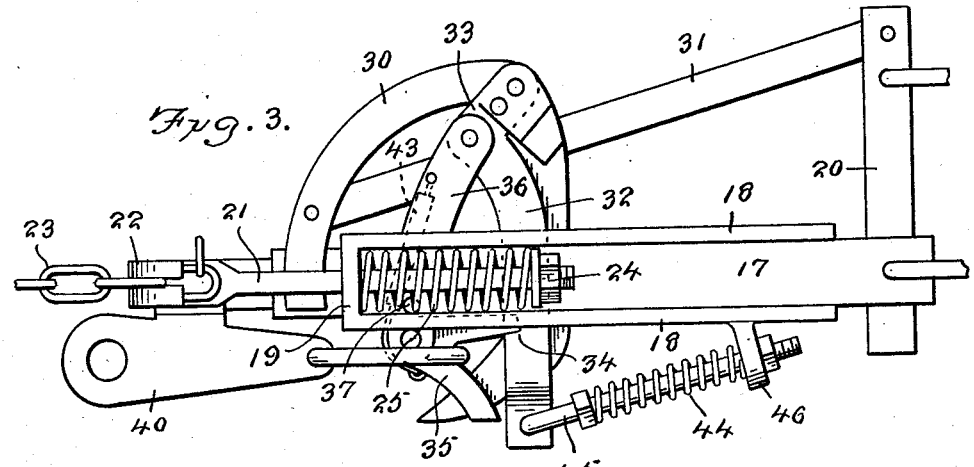
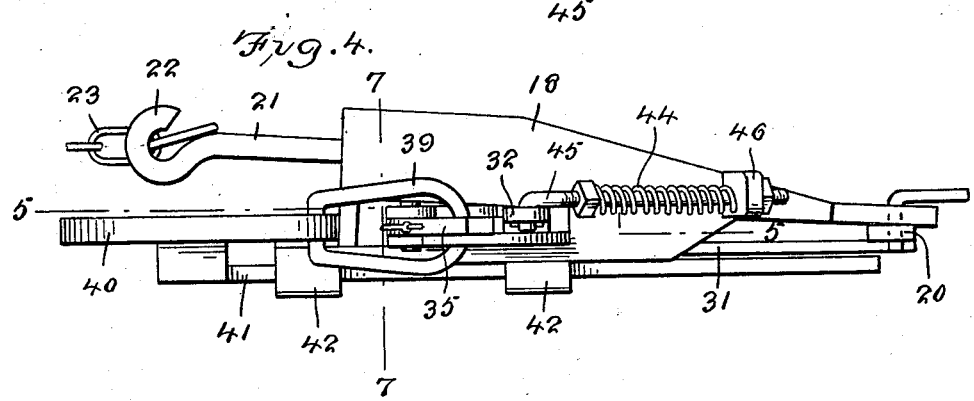
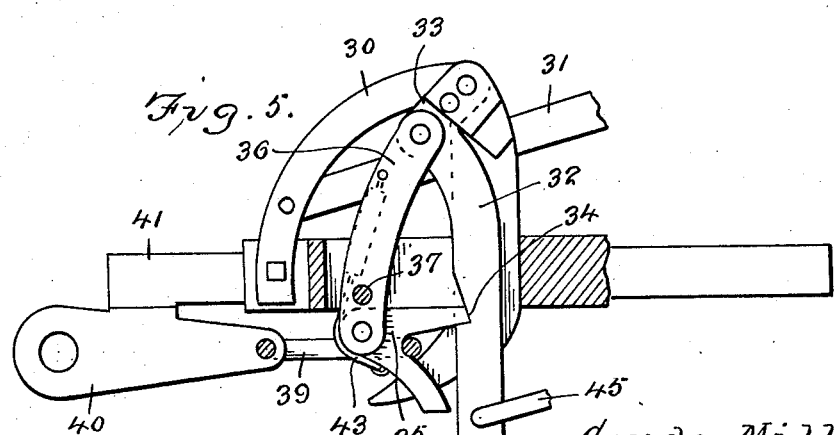

Patented July 21, 1931

1,815,794

UNITED STATES PATENT OFFICE

CONDA MILLER, OF WOODBURY, PENNSYLVANIA

PLOW HITCH

Application filed November 4, 1929. Serial No. 404,807.

The present invention contemplates the provision of a draft connection of novel construction, and while its general application is contemplated by the claims, it is primarily adapted for use in conjunction with an automobile tractor and plow or other agricultural implement, and operates to release the clutch of the tractor, should the implement being drawn thereby be stopped from any cause whatsoever.

Another object of the invention resides in the provision of a draft connection of the above mentioned character, wherein the component parts are automatically reassociated when the tractor is backed in the direction of the implement being drawn thereby.

The nature and advantages of the invention will be better understood when the following detail description is read in connection with the accompanying drawings, the invention residing in the constructon, combination and arrangement of parts as claimed.

In the drawings forming part of this application like numerals of reference indicate similar parts in the several views, and wherein :—

Figure 1 is a fragmentary top plan view of a tractor showing the draft connection associated therewith.

Figure 2 is a sectional view taken on line 2—2 of Figure 1.

Figure 3 is an enlarged top plan view of the draft connection.

Figure 4 is a side elevation taken at a right angle to Figure 3.

Figure 5 is a sectional view on line 5—5 of Figure 4.

Figure 6 is a front end elevation of the draft connection.

Figure 7 is a sectional view taken on line 7—7 of Figure 4.

Referring to the drawings in detail, 10 indicates generally a tractor of any ordinary well known construction, the clutch operating pedal for which is indicated at 11, and arranged directly in advance of a lever 12, the latter being pivoted as at 13. Arranged adjacent this lever is a curved rack bar 14 having a single notch 15, while carried by the lever 12 is a pawl 16 adapted to be received by the notch 15 in a manner to be hereinafter described in order to hold the clutch of the tractor disengaged.

The draft connection includes an elongated housing, composed of a bottom 17, opposed side walls 18 and an end wall 19, and as clearly illustrated in Figure 3 the bottom 17 projects an appreciable distance beyond the opposed side walls 18 and has connected therewith a draft tongue or cross bar 20, which is connected with the plow or other agricultural implement to be drawn by the tractor, (not shown) in any suitable manner. Slidable through an opening in the end wall 19 is a rod 21, one end of which terminates to provide a bifurcated hook like extremity 22 adapted to be connected with a chain 23, preferably in the manner illustrated in Figure 3. The other end of this rod has associated therewith a nut and washer indicated generally at 24, while surrounding the rod is a coil spring 25, the latter being interposed between the washer 24 and the end wall 19 of said housing. Manifestly the rod 21 is yieldably supported and is allowed to move through the end wall of the housing against the tension of the spring 25 for a purpose to be hereinafter described.

The chain 23 includes in its length a coil spring 26, and this spring is connected with the adjacent end of the lever 12 as clearly illustrated in Figure 2. The chain slides through the apertured branch 27 of an angle shaped bracket 28 supported on the rear of the tractor in any suitable manner, while the chain 23 also includes a relatively large link or ring like member 29, which cooperates with the bracket 28 to limit the movement of the chain in one direction, when the clutch of the tractor is disengaged incident to the stopping of the implement being drawn thereby, or when the draft load becomes excessive.

As clearly illustrated in the drawings, a substantially U-shaped frame 30 projects laterally from the bottom of the housing, and connecting the draft tongue 20 with this frame is a suitable brace 31. A lever 32 is provided with an offset extremity 33, and this extremity is provided with spaced openings to receive a suitable pivot, whereby the lever is mounted upon the frame 30 for pivotal movement. The lever 32 is formed at an appropriate point in its length with a notch 34 to cooperate with a substantially V-shaped dog 35 which is pivoted upon one end of a lever 36, the latter being also pivotally mounted upon the offset extremity of the lever 32 as clearly illustrated in Figure 5. In addition to this the lever 36 is pivoted adjacent one end as at 37.

A clevis including spaced links 38 and 39 respectively, which are carried by the opposed ends of an intermediate plate 40 is utilized to provide a connection between the tractor and the substantially V-shaped dog 35, and as clearly illustrated in the drawings, the link 38 is connected with the tractor in any suitable manner while the link 39 is adapted to receive the dog 35 in the normal arrangement of the parts. The plate 40 is carried by one end of a slide 41 and offset laterally with relation thereto, the slide 41 being mounted in suitable spaced guides 42 directly beneath the bottom of the housing above described. This slide is substantially coextensive in length with the bottom of the housing, and is moved relatively thereto when the draft connection operates to effect a release of the clutch of the tractor, but does not move a sufficient distance to become separated from its guides 42. A spring 43 is connected with the arm 36 and also with the dog 35 to assist in effecting a release of the parts in a manner to be hereinafter described.

When the tractor is coupled with the implement to be drawn thereby, through the medium of the draft connection forming the subject matter of the present invention, the link 39 of the clevis is received by the dog 35 as clearly illustrated in Figure 1, and one limb of this dog is received by the notch 34 of the lever 32. When the tractor is in operation, the lever 12 is arranged in a true vertical position directly behind the clutch pedal 11, and the parts remain in the position illustrated in Figures 1 and 3, until the implement being drawn by the tractor meets with some obstruction, which causes the implement to be stopped or the draft load to become excessive for the tractor.

Under such conditions, the tractor continues to move forwardly, and exerts a pull upon the lever 36 to the clevis connection, moving the lever 36 upon its pivot 37, and which lever 36 by reason of its pivotal connection with the lever 34 shifts the latter in a direction to separate it from the pivoted dog 35. Just as soon as the dog 35 is released by the lever 32, the dog is allowed to swing upon its pivot to a position substantially reverse to that illustrated in Figure 5, thereby releasing the clevis and disconnecting the tractor from the draft connection, except for the chain 23 which is connected with the lever 12. Now, during a continued forward movement of the tractor, a pull is exerted upon the chain 23, and as this chain is connected with the lower end of the lever 12, the latter is shifted upon its pivot 13 in the direction of the clutch pedal 11. It comes in contact with this pedal, depressing the latter in order to effect a release of the clutch, and just as soon as the clutch is so released, the pawl 16 of the lever 12 engages the notch 15 of the rack bar and holds the clutch so released. The chain 23 under the pull above described slides through the bracket 27, and just as soon as the clutch is released, the ring like member 29 of the chain is brought into engagement with the bracket 28 and thereby checks or prohibits a further pull or stretch upon the lever 12.

It is manifest however, that before the chain 23 exerts a pull upon the lever 12 for the purpose above mentioned, the rod 21 slides through the housing, and as this rod 21 is surrounded by a heavy coil spring 25, the component parts of the draft connection function to allow the clutch to be gradually engaged and disengaged under such circumstances. The heavy coil spring 25 is a very important element of the invention, and functions to stop the tractor after the clutch has disengaged, gradually and without any sudden jerks or pulls upon the implement or plow connected therewith. The degree of movement of the lever 32 in order to effect a release of the dog 35, can be varied by changing its pivotal point on the frame 30, and it can also be regulated by a tension spring 44 which surrounds a rod 45 commonly connected with the lever 32 and slidable through a bracket 46 carried by the housing as clearly illustrated in Figure 3. When the clutch has been disengaged in the manner above described, it is locked in this position by the pawl 16 engaging the notch 15 of the rack bar, and thereby prevents the clutch from assuming its normal operative position incident to any movement of the tractor, which would of course result in successive forward and rearward movements of the tractor under such conditions. It will be noted, that when the tractor has been separated from the draft connection, by the shifting of the dog 35 from the position illustrated in Figure 5, to a position substantially reverse therefrom, the dog 35 then occupies a position whereby the parts can be automatically re-associated, or re-engaged when the tractor is moved rearwardly in the direction of the implement attached thereto. In other words, when the clevis is separated from the dog 35, the slide 41 moves in the direction of the tractor, and carries the clevis, but holds the link 39 in a position, whereby on the reverse movement of the slide incident to the backing of the tractor, the link 39 will again be received by the dog 35 and the latter shifted upon its pivot to its normal position to again be engaged by the lever 32. After the tractor has been backed in the direction of the implement to be drawn thereby, and automatically connected with the draft connection, the operator releases the lever 12 from the rack bar, so that the clutch can be again engaged, while the spring 25 expands to return the rod 21 to its normal position together with its associated parts. The spring 26 included in the length of the chain 23 allows the lever 12 to be operated to permit the clutch to be reengaged when the chain is under tension as will be readily understood.

While it is believed that from the foregoing description the nature and advantages of the invention will be readily apparent, I desire to have it understood that I do not limit myself to what is herein illustrated and described, and that such changes may be resorted to when desired as fall within the scope of what is claimed.

What I claim is:—

1. A draft connection of the character described including a draft member, a tractor control element, a housing connected with the draft member, a frame like member projecting laterally from the housing, a lever pivoted on the frame and formed with a notch, a second lever pivoted adjacent one end and also having pivotal connection with the first mentioned lever, a dog pivotally supported by the second mentioned lever, a slide mounted on the housing, a clevis carried by the slide and connected with the tractor, and adapted to be engaged by said dog, said dog normally engaging the notch in the first mentioned lever for holding the tractor and draft member against relative movement, and automatically released therefrom when the draft load becomes excessive to effect a separation of the tractor from said housing, means providing a connection between the housing and said control element of the tractor to operate the latter upon continued movement of the tractor with relation to said draft member, and means for holding said control element against retrograde movement in its given position.

2. A draft connection of the character described including a draft member, a housing connected with the draft member, a frame like member projecting laterally from the housing, a lever pivoted on the frame and formed with a notch, a second lever pivoted adjacent one end and also having pivotal connection with the first mentioned lever, a dog pivotally supported by the second mentioned lever, a slide mounted on the housing, a clevis carried by the slide and adapted to be connected with the tractor, and to be engaged by said dog, said dog normally engaging the notch in the first mentioned lever for holding the tractor and draft member against relative movement, and adapted to be automatically released therefrom when the draft load becomes excessive to effect a separation of the track dog from the housing.

3. A draft connection of the character described including a draft member, a housing connected with the draft member, a slide mounted on the housing, a clevis carried by the slide and adapted to be connected with a crank dog, a frame like member projecting laterally from the housing, a dog supported by the frame like member for pivotal movement and received by said clevis, and means for holding the dog fixed with relation to the housing and adapted to be automatically released from the clevis when the draft load becomes excessive, and thereby effect a separation of the tractor from said housing.

In testimony whereof I affix my signature.

CONDA MILLER.